United States Patent

Woellhaf et al.

[11] 4,033,288
[45] July 5, 1977

[54] APPARATUS FOR COATING MAGNETIC DISKS

[75] Inventors: Josef Woellhaf, Ludwigshafen; Werner Balz, Willstaett; Roland Falk, Achern; Dieter Scheffel, Neuhofen; Volker Richter, Heidelberg; Paul Willmann, Renchen, all of Germany

[73] Assignee: BASF Aktiengesellschaft, Ludwigshafen (Rhine), Germany

[22] Filed: July 26, 1976

[21] Appl. No.: 708,602

Related U.S. Application Data

[60] Division of Ser. No. 550,363, Feb. 18, 1975, abandoned, which is a continuation of Ser. No. 306,672, Nov. 15, 1972, abandoned.

[30] Foreign Application Priority Data

Nov. 20, 1971 Germany .......................... 2157650
Jan. 3, 1972 Germany .......................... 2200023

[52] U.S. Cl. ................................ 118/52; 118/316; 118/319; 118/321
[51] Int. Cl.[2] ........................................ B05C 11/08
[58] Field of Search ............. 118/52, 53, 56, 315, 118/316, 319, 314; 427/240, 241; 34/8, 58; 134/149

[56] References Cited

UNITED STATES PATENTS

| | | | |
|---|---|---|---|
| 783,199 | 2/1905 | Heinz | 118/54 |
| 1,992,997 | 3/1935 | Drake | 427/240 X |
| 2,386,591 | 10/1945 | Campbell | 118/52 |
| 2,387,349 | 10/1945 | Powers | 118/52 X |
| 2,716,620 | 8/1955 | Green et al. | 118/52 X |
| 2,952,557 | 9/1960 | Charron | 118/52 X |
| 3,078,823 | 2/1963 | Cummings et al. | 118/306 |
| 3,467,059 | 9/1969 | Korner et al. | 118/53 |
| 3,672,932 | 6/1972 | D'Augustine | 427/240 X |
| 3,730,760 | 5/1973 | Machmiller | 427/240 X |

FOREIGN PATENTS OR APPLICATIONS 449,741 7/1936 United Kingdom .............. 118/52

Primary Examiner—Morris Kaplan
Attorney, Agent, or Firm—Keil, Thompson & Shurtleff

[57] ABSTRACT

A disk to be coated on both sides in rotatively supported within an annular housing of a larger internal diameter. Means traverse and coat each side of the rotating disk. The inner housing wall is disposed transversely to the disk and has an annular slot operatively associated with the disk whereby excess coating material is spun off the disk and into the housing. The housing is radially of a triangular cross-section, the apex offset from said disk whereby said spun off material strikes an inclined internal wall surface of the housing. Means orbit a plurality of such disks about a central axis and through a plurality of movable treating stations.

7 Claims, 3 Drawing Figures

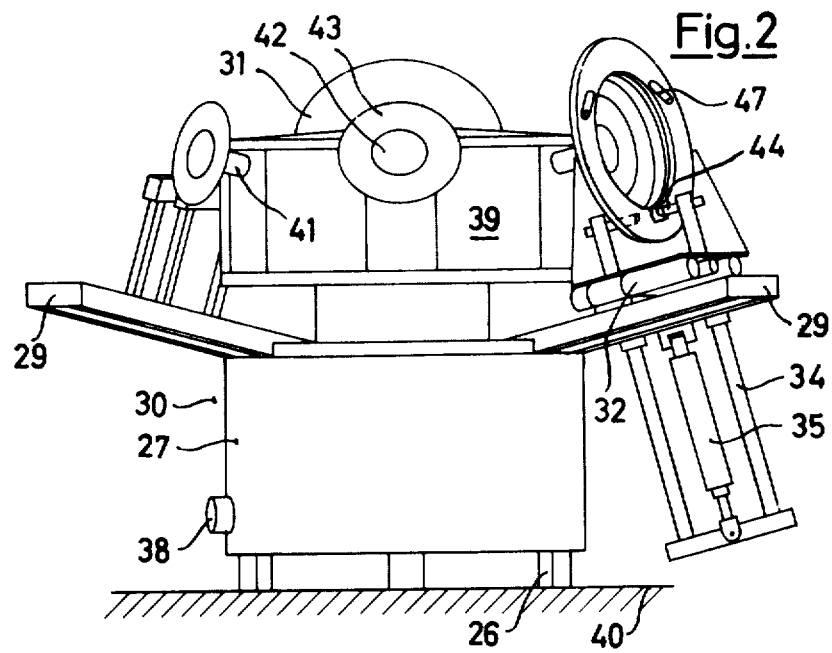
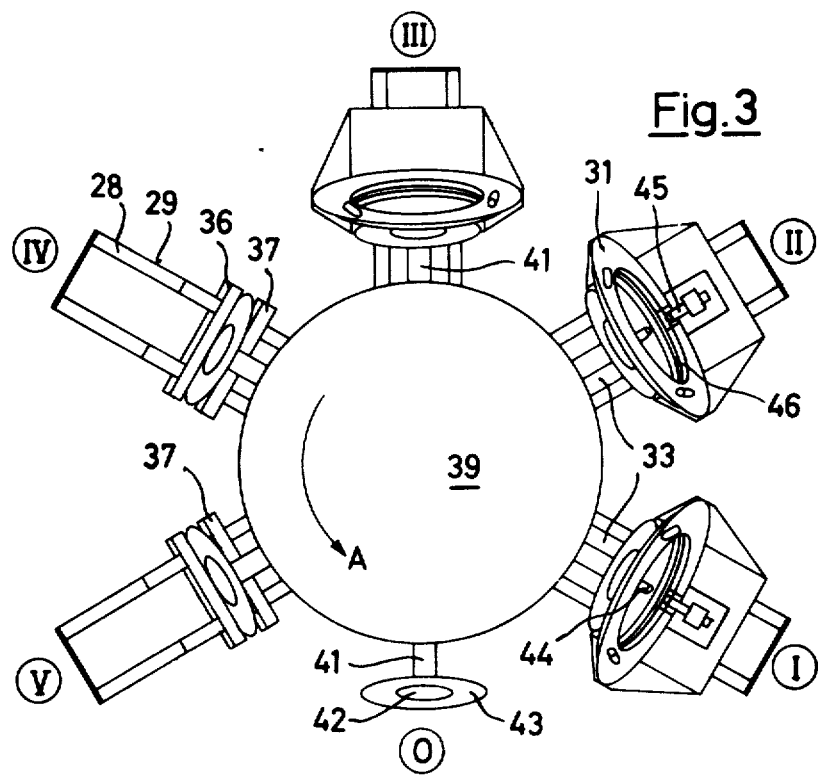

APPARATUS FOR COATING MAGNETIC DISKS

This is a division of application Ser. No. 550,363, filed Feb. 18, 1975, now abandoned, which in turn is a continuation of parent application Ser. No. 306,672, filed Nov. 15, 1972, now abandoned.

This invention relates to an apparatus for the production of the magnetic layers of magnetic disks by applying a magnetic dispersion and centrifuging the disk.

As is well known, extremely high requirements are placed on the magnetic layers of magnetic disks as regards uniformity and quality. The thickness of the magnetic layer which consists essentially of a magnetic dispersion is about 4 to 6 microns, but thicknesses of less than 2 microns are already being aimed at. The magnetic layer must be very uniform over the whole surface of the disk, that is to say, the surface must not exhibit any elevations whose height exceeds a quarter of a micron since this may result in write and read errors.

In veiw of these extremely stringent demands regarding the uniformity and quality of the magnetic layer, magnetic disks which are free from imperfections are difficult to produce and therefore expensive.

U.S. Pat. No. 3,198,657 discloses a process for the production of thin magnetic coatings by centrifuging a disk while applying a magnetic coating material, the latter being applied to one side of the cleaned metal disk through a nozzle which is moved over the disk in a radial direction. After application of the coating material the disk is centrifuged at a higher r.p.m. so that the dispersion is uniformly distributed over the surface of the disk. For coating the other side the disk is turned over and the coating procedure is repeated. In the process described above as well as in other conventional processes for the production of magnetic disks the two sides of the disk are coated successively. This results in a number of disturbing influences which impair the quality of the magnetic layers so that the number of rejects is inevitably increased. While the disk is turned over it is not protected against dust. When the second side of the disk is coated the ambient atmosphere which contains more solvent as a result of evaporation of solvent from the magnetic dispersion has an unfavorable effect on the coating on the other side as it interferes with the drying process. If drying is carried out by means of radiation, another disadvantage is that when the first side of the disk is coated the other side is still a bare polished metal surface which only absorbs little radiant heat. Optimum drying is not achieved until both sides of the disk have been coated with the dark iron oxide dispersion.

An apparatus for coating base disks with a magnetic dispersion is also known. The disk to be coated is placed by hand on a horizontally rotatable, electrically driven support and fastened to it by means of a suitable device. After closing a cylindrical casing the disk is rotated and cleaning solution is sprayed onto the side of the disk facing upward through a nozzle which is moved over the disk. After the solution has been removed by centrifuging or evaporation a nozzle for applying the magnetic dispersion is moved once or several times over the uppersurface of the disk. Then the r.p.m. employed during the cleaning and application steps is increased so that the dispersion is distributed uniformly over the surface and excess dispersion is removed from the disk by centrifugal force. The operations described above are controlled substantially automatically by means of control elements and/or time switches. When the coating of the first side has been completed the disk is turned over by hand and the cleaning, application and centrifuging steps are repeated automatically; at the end of the last step the second side also bears a still moist layer of dispersion. This conventional apparatus has the disadvantage that only one side of one disk can be coated at any one time so that quite a number of such apparatuses and the corresponding number of operators are required if series production of magnetic disks is to be carried out. Moreover, there is a risk of the drying magnetic layers being damaged by handling, and imperfections in the coating cannot be avoided as a result of the presence of dust.

It is an object of the present invention to provide an apparatus for the production of the magnetic layers of magnetic disks in which both sides of the disks are coated with magnetic dispersion in a more efficient and more economical way. Another object of this invention is to provide a relatively simple, but extremely efficient, substantially automatic apparatus.

These objects are achieved in accordance with this invention and the preparation of magnetic layers of magnetic disks coated on both sides with thin magnetic layers of the same type and thickness by applying a pourable magnetic dispersion to the disk to be coated, centrifuging the disk and drying or curing the resultant thin magnetic layer, can be carried out with particular advantage by applying the magnetic dispersion to the two surfaces of the disk simultaneously. Advantageously the subsequent drying or curing of the magnetic layers thus applied is also carried out simultaneously and in the same manner. Preferably, coating in accordance with this invention is effected by applying the magnetic dispersion simultaneously to the two sides of the rotating disk arranged at an angle to a vertical plane, particularly by spraying through nozzles, and removing any excess dispersion from the disk by centrifuging. It has been found to be advantageous to collect the excess dispersion thus removed in a casing near the outer edge of the disk in such a way that the dispersion is prevented from rebounding, flowing back or dripping back, and to extract the vapors of the solvent of the magnetic dispersion.

Suitable magnetic dispersions are those conventionally used. They usually contain — in addition to the finely divided magnetic pigment, such as gamma-iron-(III) oxide, magnetite or ferromagnetic metal pigments, having a particle size of from about 0.2 to 2 microns — binders, particularly heat-curable binders such as epoxy resins, phenoxy resins, aminoplast precondensates, polyester resins, polyurethanes and polyurethane-forming substances as well as mixtures of such binders with one another or with other binders such as polycarbonates and vinyl polymers, e.g., vinyl chloride copolymers and vinylidene chloride copolymers, and heat-curable acrylate copolymers or methacrylate copolymers. Moreover, the magnetic dispersion usually contain volatile solvents which make them capable of being poured or sprayed through nozzles, e.g., tetrahydrofuran, toluene, methyl ethyl ketone, etc., the choice of the type of solvent used being governed by, inter alia, the binder used. Magnetic dispersions suitable for the process according to the invention advantageously have a viscosity of from about 40 to 200 centipoises, preferably from 60 to 150 centipoises, measured by means of a Rheomat 15, model RM 15 C/01 (Contraves, Zurich). The ratio of magnetic pigment to binder usually is from 2 to 10, especially 3 to 5, parts by weight of magnetic pigment to 1 part by weight of binder. The production of the magnetic dispersion may be carried out by a conventional method, using conventional additives such as dispersing agents and lubricants.

In the apparatus according to the invention the disks are usually rotated at from 400 to 3500 r.p.m., the speed chosen depending on the viscosity of the magnetic dispersion and the desired thickness of the magnetic layer to be prepared. The thicknesses of the finished dried magnetic layers range from 1 to 10 microns, especially 1 to 5 microns; in order to prepare the thinner magnetic coatings a high speed of rotation, at least in the centrifuging operation, and/or a low viscosity of the magnetic dispersion are chosen. The application of the magnetic dispersion — advantageously after cleaning the uncoated metal disks with solvent — is carried out by the spin-coating method, the magnetic dispersion being sprayed on in an excess through nozzles moving parallel to the disk in a radial direction from the inner edge to the outer edge of the disk and preferably first from the outer edge to the inner edge and then from the inner edge to the outer edge of the disk.

The apparatus according to the invention comprises a drive and a holding device for rotating the disk to be coated and units for applying the magnetic dispersion simultaneously to the two sides of the disk and is characterized in that the disk to be coated is arranged at an angle to a vertical plane during application of the magnetic dispersion.

In a very advantageous embodiment of the apparatus according to the invention the disk is arranged at an angle of from 10° to 30° to a vertical plane.

In the preferred embodiment of the apparatus according to the invention the disk is surrounded, at least at or near its outer edge, by a substantially rotation-symmetrical casing whose cross section is approximately an isosceles triangle, the casing wall which is nearest to the outer edge of the disk being provided with a slot in the plane of the disk. Moreover, the casing is advantageously so designed that the vertex of the smallest angle between two casing walls is not situated in the plane of the disk. In this way it is ensured that dispersion flung off the disk during application is collected without there being any risk of the coatings being damaged or destroyed by drops of dispersion which drip back or are flung back onto the disk.

An apparatus for the automatic production of magnetic coatings of magnetic disks comprising at least one take-up and rotation device for at least one disk to be coated and at least one device for applying the magnetic dispersion is of a particularly advantageous design if one or more take-up and rotation devices form a first unit and one or more application devices form a second unit, the two units being movable in relation to one another.

This apparatus makes it possible to coat the disks in a very efficient way.

In an advantageous embodiment of the apparatus according to the invention the second unit additionally comprises a drying device. This ensures that the coatings can be predried, before removal of the disks from the apparatus, to such an extent that they are insensitive to external influences.

In a preferred embodiment of the apparatus according to the invention the first unit is capable of being automatically revolved in steps in relation to the second unit. Such an apparatus can be constructed in a compact form and at low cost in relation to the great advantages it offers.

In a particularly advantageous embodiment of the apparatus according to the invention the take-up devices are capable of being inclined, by means of the rotation devices arranged on the first unit, at an angle of from 10° to 30° and preferably at an angle of 15° to the central axis of the first unit and the application devices arranged on the second unit can be moved over both sides of the disk to be coated.

This embodiment enables the two sides of the disk to be coated simultaneously so that particularly uniform coatings can be prepared in an economical manner.

In another advantageous embodiment of the apparatus according to the invention the first unit contains at least one and preferably four take-up and rotation devices for the disks and the second unit contains one application device for cleaning solution, one application device for magnetic dispersion and at least one drying device, the application devices of the second unit being automatically movable in relation to the take-up and rotation devices of the first unit.

This embodiment makes it possible to clean, coat and dry at least one disk within one complete revolution of the first unit in relation to the second unit and to process at least three further disks at any one time in the various devices of the apparatus if finished disks and disks to be coated are continuously removed from or introduced into the apparatus.

Further details of the invention will be apparent from the following description and the accompanying drawing of embodiments of the apparatuses according to the invention.

In the accompanying drawing

FIG. 2 is a side elevation of an apparatus for automatically coating and drying several disks;

FIG. 3 is a plan view of the apparatus according to FIG. 2.

Figure 1:
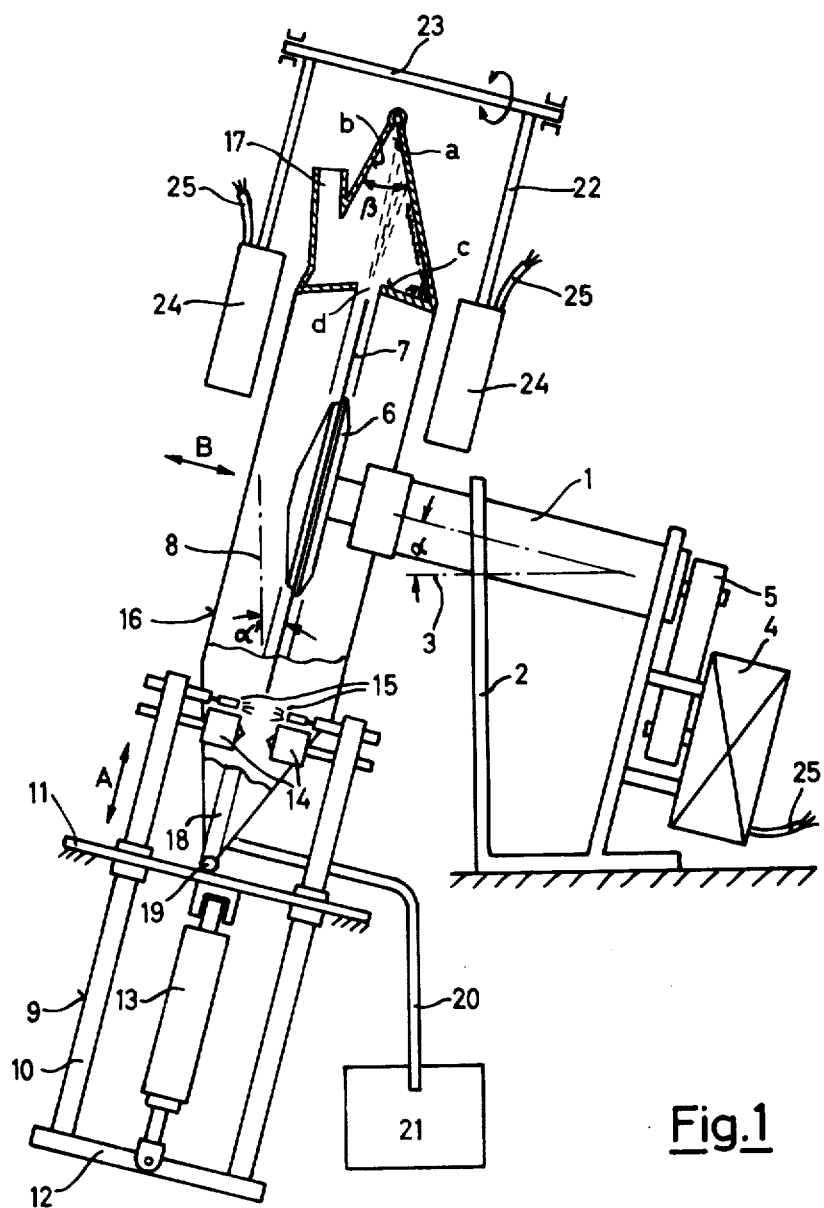
FIG. 1 is a side elevation of take-up, rotation and coating device for one disk.

Referring to FIG. 1, a driving shaft 1 is supported by a frame 2 at angle $\alpha = 15°$ to a horizontal plane 3. The shaft is driven by a motor 4 via a gear unit 5 with which the speed of rotation can be varied. At its free end the driving shaft 1 carries a disk 7 firmly fastened in a clamping device 6, the disk 7, which is to be coated, usually consisting of aluminum or an aluminum alloy. The disk 7 is arranged at an angle $\alpha'$ to a plane 8 which is perpendicular to the horizontal plane 3 and penetrates the drawing plane. In the embodiment shown in the drawing $\alpha'$ is equal to $\alpha$. Angle $\alpha'$ is preferably from 10° to 30°.

FIG. 1 also shows a unit 9 which serves to clean the disk 7 and to apply dispersion thereto and which can be moved parallel to the plane of the disk 7. The unit 9 consists of a frame 10 which is U-shaped in the present case and which is capable of being moved in the directions of the double arrow A in relation to a fixed guide member 11. A hydraulically operated member 13 is fastened to the guide member 11 and to the short end piece 12 of the frame 10. The unit 9 is shown in the rest position. At the inner sides of the free arms of the frame 10 there are arranged nozzles 14 and brushes 15. During the cleaning operation the unit 9 and with it the nozzles 14 and brushes 15 are moved by the hydraulic member 13 radially over the rotating disk 7. Both sides of the disk are sprayed with solvent by means of other nozzles (not shown in the drawing) and cleaned by means of the brushes 15. After completion of the cleaning operation the unit 9 returns to its position of rest. Subsequently the unit 9 is again moved over the surfaces of the disk to effect application of the magnetic dispersion; the brushes 15 must be put out of action for this period of time in an appropriate way. The magnetic dispersion is sprayed under pressure simultaneously onto the two sides of the disk by means of the nozzles 14 while the disk is rotated at a specific r.p.m. The magnetic dispersion contains the finely particled magnetic pigments dispersed in a suitable pourable binder or in a solution of the binder in a volatile solvent. The opening and closing of the valves of the nozzles 14 is controlled in dependence on the position of the nozzles 14 in relation to the disk 7. For example, the nozzles 14 may be opened when they are situated over the outer edge or the inner edge or even before they reach the outer edge of the disk 7 as they travel in an inward direction. Movement of the unit 9 and hence of the nozzles 14 over the disk or parts thereof may be effected once or several times. After completion of the coating operation the unit 9 is returned to its position of rest shown in the drawing. The nozzles 14 and brushes 15 move along radial slots (not shown in the drawing) provided in an annular casing 16. It is obviously also possible to arrange the means for cleaning the disks (nozzles for solvent, brushes) as a unit separate from the unit for the application of magnetic dispersion.

As may be seen from the upper part of the casing 16, shown in section, the three walls $a$, $b$ and $c$ of the casing form a triangle. Wall $b$ is provided with a connection 17 for removing the solvent vapors. The vertex angle $\beta$ of the approximately isosceles triangle is about 40°, i.e., it is the smallest angle in the triangle. The wall $c$ facing the disk is interrupted by an annular slot $d$ which, as may be seen from the drawing, extends around the outer edge of the disk 7 and serves to take up the magnetic dispersion flung off the disk after application. The two parts of wall $c$ are slightly bent towards the outer edge of the casing in order to prevent the magnetic dispersion from flowing or dripping back onto the surfaces of the disk. The vertex of the smallest angle $\beta$ is situated in a plane some distance apart from the plane of the rotating disk, the distance being about 1 to 2 cm in the embodiment shown. Walls $a$ and $b$ are held together in the vertex of angle $\beta$ by means of a clamping ring 18, the joint between the two walls being sealed with a gasket 19 of circular cross section. It is therefore possible to take the casing apart, a feature which facilitates cleaning.

After completion of the coating operation the speed of rotation of the driving shaft 1 and hence of the disk 7 is increased considerably so that the magnetic dispersion is uniformly distributed over the surfaces of the disk and excess dispersion is flung off. The centrifugal force acting on the disk 7 at this increased speed should be so high that the influence of gravity is negligible. The casing 16 serves to collect excess dispersion, which flows into the lower part of the casing from which it can be passed through a discharge tube 20 into a waste vessel 21. The casing 16 is moved over the disk 7 in the direction of the double arrow B before the cleaning operation and returned to its position of rest (not shown) before the drying operation.

The inclined position of the disk during coating and centrifuging makes it possible to coat both sides of the disk even without using a casing. Normally, however, a casing will in fact be used. It should be so designed that during the centrifuging operation excess dispersion cannot be thrown back onto the disk. This object is achieved by arranging, in accordance with the preferred embodiment, the walls $a$, $b$ and $c$ in such a way that the cross section of the casing is approximately an isosceles triangle and the vertex of the triangle is offset with respect to the plane of the disk 7. Other cross sections suitable for preventing dispersion from being flung back are also conceivable. Excess dispersion is thrown through the annular slot into the interior of the casing. The width of this slot should however be as small as possible to ensure that as little solvent vapor as possible flows back to the disk. The solvent can be rapidly removed from the interior of the casing through an outlet 17 connected with any suitable exhaust equipment.

After completion of the centrifuging operation the casing 16 is moved away from the disk 7. A drying unit 22 consists of an axle 23 which can be pivoted as indicated by a double arrow and which carries heating elements 24 extending over the magnetic coatings of the disk 7. After the casing has been removed the heating elements are swung into the position shown; as a result of the radiant heat acting on the dark magnetic coatings the latter are dried rapidly and uniformly at the same time. During the drying operation the speed of rotation is advantageously lower than during centrifuging; for example, the r.p.m. used in the application of the magnetic dispersion is employed again.

After drying has been completed the coated magnetic disk can be removed from the clamping device 6 without there being any risk of it being damaged.

The motor 4 and the heating elements 24 are provided with lengths of cable 25 for connection to a power supply (not shown).

The control of the various operations carried out in coating the disks is not the subject of this invention and therefore not dealt with here.

By appropriate arrangement, described in detail below, of the individual stations for carrying out the various operations it is possible to achieve very substantial automation of the apparatus according to this invention.

Referring to FIGS. 2 and 3, a unit 30 arranged on feet 26 comprises a cylindrical casing 27. At the upper circumference of the casing 27 arms 29 in the form of rails 28 extend outwardly in a radial arrangement, forming the basis for fixed stations I to V. On the arms of stations I to III there are arranged rotation-symmetrical spray casings 31 which are radially movable by means of hydraulic members 32, the necessary pump unit for actuating these hydraulic members not being shown in the drawing. In the slots 33 between the rails of stations I and II means 34 for applying magnetic dispersion are provided which can be moved by further hydraulic members 35 (also actuatable by the pump unit not shown in the drawing) in a direction approximately vertical to the direction of the arm 29. Drying units 36 each comprising two heating elements 37 are fastened to the arms 29 of stations IV and V. Near the bottom of the casing 27 there is provided an inlet 38 for compressed air for ventilation purposes. An approximately circular unit 39 provided with six driving shafts 41 extending outwardly in a radial direction and arranged at an angle to the horizontal plane 40 is situated centrally above the arms 29. The driving shafts are provided at their ends with take-up means 42 for disks 43 to be coated. These take-up means 42 may be clamping devices with which the disks 43 are fastened to the shafts 41 centrally to the latters' axes and in such a way that they are firmly attached to them. The shafts 41 which are driven by one or more motors arranged in the casing 39 rotate the disks 43. As indicated in the drawing by an arrow A, the unit 39 can be turned in relation to the unit 30 and hence in relation to the take-up and withdrawal station 0 and stations I to V by means of a drive situated in the unit 30.

The mode of operation of the automatic apparatus is described below.

A disk 43 to be coated is fastened in the clamping device 42 of the station O. When the unit 39 is turned and with it the shaft 41 in the direction of the arrow A, the disk 43 is moved in the same direction, i.e., first to station I; when the disk 43 has reached the correct position at that station, movement of the unit 39 is stopped. The stopping signal simultaneously causes the spray casing 31 of station I to be moved over the disk 43 so that the application unit 34 can be actuated whose nozzles 44 are passed radially over the surfaces of the disk. At the same time the disk 43 is rotated and cleaning solution is sprayed onto its surfaces so that the cleaning solution is uniformly distributed. After the supply of cleaning solution has been stopped, the solution is flung off the disk. When a predetermined period of time has elapsed the casing 31 returns to its original position and the disk 43 is transported to station II where a casing 31 and nozzles 45 are actuated and cleaning solution is sprayed on in the same way as described for station I. After completion of the cleaning operation rotation of the disk 43 is discontinued and the disk is moved to the coating station III. Before application of the dispersion is commenced the disk is caused to rotate at a low speed and then the nozzles 45 are passed in radial direction over both surfaces of the disk once or several times, the dispersion being applied continually or intermittently. Dispersion which is flung off the disk enters the casing 31 through the annular slot 46 with which all casings 31 are provided. The casing 31 is so designed that solution or dispersion which has passed through slot 46 cannot flow or be thrown back onto the disk but is drained off through an outlet (not shown) provided at the lower part of the casing into a waste vessel (not shown). Moreover, the wall of the casing 31 has a number of ventilation slots 47 through which the solvent contained in the magnetic dispersion or the cleaning solution can escape in vaporous form so that the air containing solvent vapor can be removed rapidly from the vicinity of the freshly coated disks. When application of the dispersion has been completed the disk 43 is rotated at a higher speed than during application of the dispersion so that even more uniform distribution of the dispersion over the disk surfaces is achieved and the remaining excess of dispersion is removed by centrifugal force. The speeds of rotation employed during application and centrifuging may be equal if a dispersion of appropriate viscosity is used. The layers of dispersion applied to the disk are then dried at station IV by means of radiant heat or hot air. The heating elements 37 between which the disk 43 is moved extend over approximately the width of the coated surfaces. At station IV the disk 43 is again rotated at the lower speed; however, the r.p.m to be employed depends on the properties of the dispersion and the drying properties of the heating elements 37, whose radiation may for example be in the infrared or microwave range or in the range of visible light. The second drying station V can be dispensed with if the station time for all stations is increased to such an extent that complete drying can be effected at station IV. In this case the dry coated disk can be removed at station V. If station V is used as an additional drying station — as shown in the drawing — the disk is withdrawn at the station 0. In accordance with the description given above, movement of the unit 39 and hence of the disks 43 is effected at specific regular intervals from station to station. The station with the longest operating time determines the station time for all stations. Movement of units 30 and 39 in relation to one another and of the individual pieces of equipment in relation to the disk 43 is controlled by a unit which is not shown in the drawing and which is not a subject of this invention.

The above description of the mode of operation of the apparatus according to the invention deals with the case where only one disk 43 is treated per cycle of operation so that only one driving shaft is required. However, this already ensures a considerable saving in time and completely satisfactory coating and drying of both sides of the disk. Even the coating of only one side of one or several disks during one revolution of the unit 39 may be advantageous if the single drying station IV or the drying stations IV and V are only operated during every second revolution of the unit 39 and the disk or disks are automatically turned over after the first revolution of the unit 39 so that the two sides of the disk or disks are coated successively but dried simultaneously. Simultaneous drying is necessary to ensure that the two sides exhibit the same properties, e.g., the dark color of the magnetic dispersion, for drying by radiation.

In another embodiment of an automatic coating and drying apparatus, which has been mentioned above but not shown in the drawing, the disks 34 are not arranged in an inclined position. Quite generally, such an arrangement of the disks is not necessary in any of the embodiments described above, because coating can also be carried out with the disk rotating in a vertical plane if an appropriate viscosity of the magnetic dispersion and an appropriate speed of rotation are chosen. However, for the usual ranges of viscosity and speeds of rotation, i.e., 40 to 200 centipoises and 200 to 4000 r.p.m., rotation at an angle within the range indicated above is advantageous.

If six driving shafts 41 for disks 43 are provided in the apparatus, all coating and drying operations can be carried out during one revolution of the unit 39 with optimum utilization of the apparatus so that the apparatus of the invention can replace about 20 automatic apparatuses of prior art design. The unit 39 should however be advantageously equipped with at least four driving shafts so that during each revolution of the unit 39 one disk is finished and three further disks are processed at one of the stations I and II, at station III and at one of the drying stations IV and V. In this case station O may serve as take-up and withdrawal station for the disks.

The apparatus of the invention has surprisingly great advantages over prior art processes and apparatuses for the production of the magnetic coatings of magnetic disks. Thus, the use of the apparatus according to the invention in commercial-scale production not only results in the production capacity being increased several times over thanks to the simultaneous coating of both sides of the disk, but also brings about a surprisingly high decrease in the number of rejects with smaller losses of magnetic dispersion, as compared with prior art apparatus. The magnetic disks prepared in accordance with the invention are distinguished by outstanding uniformity of the magnetic coatings on the two sides of the disk and fulfill all requirements placed on modern magnetic disks. A particular advantage is that the said uniformity of the two coatings is also achieved in the case of disks having very thin magnetic layers. The fact that, although the production of the magnetic layers of magnetic disks has been known for many years, an apparatus for the simultaneous coating of the two sides of a disk has hitherto not been disclosed which may be regarded as a prejudice against the apparatus of the invention with its unexpected advantages.

We claim:

1. An apparatus for coating both sides of a disk with magnetic material comprising:

a rotatable support means whereon said disk is supported in an inclined generally vertical position;

an annular housing which is radially of a generally triangular cross-section and having an inner diameter which is larger than said disk;

means to traverse a pair of opposed coating material projecting nozzles from an inner part of said disk outwardly past the extent of the disk at a lower section thereof whereby to apply coating material to each side of the disk;

means to rotate said support at speeds whereby said coating material is subjected to centrifugal forces to distribute the applied material uniformly over said sides and excess applied material is spun off;

the inner wall of said housing being disposed generally transversely to the plane of said disk, having a generally centrally disposed annular slot aligned with and effectively wider than said disk, whereby to receive said spun off material, and being configurated so as to direct and retain said coating material from returning through said slot;

the plane through the apex of the remaining walls of said housing being offset from the plane of said disk whereby said spun off material received through said slot strikes an inclined internal wall surface of said housing; and said apparatus including means to dry the coated substrate.

2. An apparatus as claimed in claim 1 wherein said supported disk is at an angle of from 10° to 30° to the vertical plane.

3. An apparatus as claimed in claim 1 wherein said means to dry comprises spaced heater means movably mounted and adapted to be moved on said mounting between a non-operative position and a functional position straddling said coated disk at an upper section thereof.

4. An apparatus as claimed in claim 1 wherein said housing has a pair of opposed vertical slots in the lower part thereof operatively associated with said pair of traversing nozzles.

5. An apparatus as in claim 1 wherein said disk support extends radially from a rotatable turret;

means are provided to rotate said turret;

said means to dry are spaced from said nozzles and operatively located along the orbital path traversed by said disk;

said annular housing and dryer means are movably supported by means adapted to selectively withdraw said housing and dryer means from the path of said orbiting disk and to selectively return said housing and dryer mean to an operative position with respect to a disk indexed along said path by said turret.

6. An apparatus as in claim 5 wherein a plurality of said disk supports extend radially from said turret for indexing along said path and a plurality of movable treating stations are operatively disposed along said path whereby a plurality of disks may be simultaneously treated.

7. An apparatus as in claim 6 wherein at least one of said treating stations is a disk cleaning station.

* * * * *